United States Patent
Nilsson et al.

(10) Patent No.: US 9,946,232 B2
(45) Date of Patent: Apr. 17, 2018

(54) DETERMINING A MACHINE CONDITION

(75) Inventors: Mikael Nilsson, Trollhattan (SE);
Daniel Norder, Uddevalla (SE)

(73) Assignee: GKN Aerospace Sweden AB,
Trollhattan (SE)

( * ) Notice: Subject to any disclaimer, the term of this patent is extended or adjusted under 35 U.S.C. 154(b) by 589 days.

(21) Appl. No.: 14/407,634

(22) PCT Filed: Jun. 19, 2012

(86) PCT No.: PCT/SE2012/000095
§ 371 (c)(1),
(2), (4) Date: May 7, 2015

(87) PCT Pub. No.: WO2013/191595
PCT Pub. Date: Dec. 27, 2013

(65) Prior Publication Data
US 2015/0234365 A1 Aug. 20, 2015

(51) Int. Cl.
*G01M 1/38* (2006.01)
*G05B 13/02* (2006.01)
*G05B 15/02* (2006.01)
*G06F 17/30* (2006.01)

(52) U.S. Cl.
CPC ........... *G05B 13/024* (2013.01); *G05B 15/02* (2013.01); *G06F 17/30424* (2013.01)

(58) Field of Classification Search
None
See application file for complete search history.

(56) References Cited

U.S. PATENT DOCUMENTS

| | | | |
|---|---|---|---|
| 3,588,265 A | 6/1971 | Berry | |
| 4,215,412 A * | 7/1980 | Bernier | G07C 3/00 701/100 |
| 5,210,704 A | 5/1993 | Husseiny | |
| 6,301,970 B1 | 10/2001 | Biggs | |
| 6,490,543 B1 | 12/2002 | Jaw | |
| 6,774,786 B1 | 8/2004 | Havekost | |
| 7,149,657 B2 | 12/2006 | Goebel et al. | |
| 7,197,430 B2 | 3/2007 | Jacques et al. | |
| 8,082,115 B2 | 12/2011 | Bechhoefer et al. | |
| 2006/0243055 A1 | 11/2006 | Sundermeyer et al. | |
| 2007/0198215 A1 * | 8/2007 | Bonanni | G05B 23/0283 702/183 |
| 2008/0040152 A1 | 2/2008 | Vian et al. | |

(Continued)

FOREIGN PATENT DOCUMENTS

EP 2390742 A1 11/2011
EP 2434362 A2 * 3/2012 ......... G05B 23/0272

OTHER PUBLICATIONS

International Search Report for PCT/SE2012/000096 dated May 2, 2013 (5 pages).

(Continued)

*Primary Examiner* — Philip Wang
(74) *Attorney, Agent, or Firm* — Bejin Bieneman PLC

(57) ABSTRACT

A set of load data for a selected point in time and resulting from the machine operation is received. The load data is provided from a first database comprising predefined machine conditions associated to different sets of load data for the machine. One of the predefined machine conditions that is most representative of the received set of load data is selected.

19 Claims, 3 Drawing Sheets

(56) References Cited

U.S. PATENT DOCUMENTS

| | | | |
|---|---|---|---|
| 2009/0254286 A1 | 10/2009 | Tulyani | |
| 2009/0306909 A1* | 12/2009 | Mattes | G01M 5/0016 702/36 |
| 2011/0060568 A1 | 3/2011 | Goldfine | |
| 2011/0106510 A1 | 5/2011 | Poon | |
| 2011/0137575 A1* | 6/2011 | Koul | G05B 23/0245 702/34 |
| 2012/0051911 A1 | 3/2012 | Baik et al. | |
| 2012/0101706 A1 | 4/2012 | Masse et al. | |

OTHER PUBLICATIONS

Written Opinion of the International Searching Authority for PCT/SE2012/000096 dated May 2, 2013 (6 pages).
International Search Report for PCT/SE2012/000094 dated May 2, 2013 (5 pages).
Written Opinion of the International Searching Authority for PCT/SE2012/000094 dated May 2, 2013 (8 pages).
International Search Report for PCT/SE2012/000093 dated May 2, 2013 (5 pages).
Written Opinion of the International Searching Authority for PCT/SE2012/000093 dated May 2, 2013 (7 pages).
International Search Report for PCT/SE2012/000095 dated May 2, 2013 (5 pages).
Written Opinion of the International Searching Authority for PCT/SE2012/000095 dated May 2, 2013 (7 pages).
Abbas_2009 (A System-Level Approach to Fault Progression Analysis in Complex Engineering Systems, Annual Conference of the Prognostics and Health Management Society, 2009).
Singh_2005 (Assessing Useful Life of Turbomachinery Components, Proceedings of the Thirty-Fourth Turbomachinery Symposium, 2005).
Inman_2005 (Damage Prognosis for Aerospace, Civil and Mechanical Systems, John Wiley & Sons, Ltd. 2005).
Non-Final Office Action dated Jun. 16, 2017 for U.S. Appl. No. 14/407,628 (51 pages).
Pfoertner, H. "The information content of turbine engine data—a chance for recording-based life usage monitoring", Aerospace Conference Proceedings, 2002. IEEE Piscataway, NJ, USA, Mar 9-16, 2002, vol. 6, p. 2975-2985. Publication date Mar. 9, 2002. ISBN 978-0-7803-7231-3; ISBN 0-7803-7231-Xs.
Iyyer; Sarkar N; Merrill S; Phan R; N, "Aircraft life management using crack initiation and crack growth models—P-3C Aircraft experience" International Journal of Fatigue, vol. 29, No. 9-11, p. 1584-1607 (2007). Butterworth Scientific Ltd, Guildford, GB. Publication date Aug. 23, 2007. ISSN 0142-1123 doi: 10.1016/j.ijfatigue.2007.03.017.
Papzian J M; Anagnostou E L J; Engel S; Fridline D; Hoitsma D; Madsen J; Nardiello J; Silberstein R P; Welsh G; Whiteside J B, "SIPS, A Structural Integrity Prognosis System," Aerospace Conference, 2007 IEEE, Piscataway, NJ, USA (Ed.Le Pera A; Forni F; Grossi M; Lucente M; Palma V; Rossi T; Ruggieri M), p. 1-10, Publication date: Mar. 3, 2007, ISBn 978-1-4244-0524-4; ISBN 1-4244-0524-6.
Kadhim N A ; Abdullah S; Ariffin A K, "Effective strain damage model associated with finite element modelling and experimental validation," International Journal of Fatigue, vol. 36, No. 1, 194-205 (2011). Publication date Jul. 18, 2011. ISSN 0142-1123, doi: 10.1016/j.ijfatigue.2011.07.012.
International Preliminary Report on Patentability for PCT/SE2012/000096 dated Dec. 31, 2014 (7 pages).
International Preliminary Report on Patentability for PCT/SE2012/000094 dated Dec. 31, 2014 (10 pages).
International Preliminary Report on Patentability for PCT/SE2012/000093 dated Dec. 31, 2014 (8 pages).
International Preliminary Report on Patentability for PCT/SE2012/000095 dated Dec. 31, 2014 (8 pages).
Non-Final Office Action for U.S. Appl. No. 14/407,631 dated May 17, 2017.
Final Office Action dated Nov. 15, 2017 for U.S. Appl. No. 14/407,631 (34 pages).
Bogard_2011 (Numerical Modeling of Fatigue Damage and Fissure Propagation under Cyclic Loadings, International Journal of Damage Mechanics, SAGE Publications, 2008, 174 (2), pp. 173-187. <10.1177/1056789508088961>. <hal-00571173>).
LeVeque_2005 (Finite Difference Methods for Differential Equations, AMath 585-586 University of Washington Version of Sep. 2005).
Non-Final Office Action for U.S. Appl. No. 14/407,623 dated Feb. 7, 2018 (78 pages).
PAControl_2006 (Instrumentation & Control: Process Control Fundamentals, 2006, downloaded from www.PAControl.com).
Lee_1999 (Computer-aided Maintenance: Methodologies and Practices, Springer US, 1999).
Ray_1994 (Fatigue damage control of mechanical systems, Smart Mater, STruct. 3 (1994) 47-58. UK.
Final Office Action dated Dec. 27, 2017 for U.S. Appl. No. 14/407,628 (39 pages).

* cited by examiner

DETERMINING A MACHINE CONDITION

CROSS-REFERENCE TO RELATED APPLICATIONS

This application is a National Phase of, and claims priority to, International Application No. PCT/SE2012/000095 filed on Jun. 19, 2012, of which application is hereby incorporated herein by reference in its entirety.

BACKGROUND

Today, there is significant interest in improving the prediction of the life consumption of individual components in a machine, in particular machines with moving parts. By improving the accuracy of such methods, the applied safety limits may be reduced, and unnecessary replacement of components may be avoided. When applied to an entire fleet (e.g., a military aircraft fleet) the cost savings may be significant as well as allowing for an increased operational lifetime. Furthermore, in the unusual event that conventional methods are too optimistic, refined methods may avoid failure of components, thus avoiding uncalculated stops in operation or even more importantly accidents.

Examples of interesting applications where improved life consumption predictions may be useful include aircrafts, gas/steam turbines, trucks, loaders, nuclear plants and wind turbines.

A conventional method for predicting the life consumption of a component in a machine is to measure one or a combination of the usage/run time, distance or count the number of cycles of a predefined load session or a conservative load session. A load session is the time when the machine is in operation, for example for an aircraft a load session may be defined as flying from point A to point B with a predefined rotor speed variation.

In the field of aircrafts, the life consumption of an engine is sometimes determined by making a "simplified" cycle count, focusing on the usage of a specific engine component. There are also available more specific and at least in some sense more reliable methods where, e.g., ELCF (equivalent low cycle fatigue) cycles for the specific, for example, engine component is determined. Such ELCF cycles may for example be calculated based on the high pressure rotor speed of an aircraft jet engine recorded during a load session. The cycles may be determined by the number of times the high pressure rotor speed exceeds certain selected and predefined rotor speeds. Furthermore, to calculate the ELCF cycles, scale factors are determined for the cycles based on predetermined load sessions. However, a major drawback with ELCF cycles is that the prediction of life consumption will have errors if the actual load sessions experienced by a specific component differs significantly from the predetermined load sessions, which the scale factors are based upon.

As demands for cost efficiency and reliability increase, the interest in finding better models for predicting life consumption has also increased. This is made specifically apparent as the conventional methods do not take all significant load cycles into consideration. For example, the method of counting ELCF cycles only considers one engine parameter of the entire engine while the life consumption of the critical components an engine or machine may vary depending which loads are most important for the life consumption of the respective component.

In order to more accurately determine the life consumption of, e.g., an engine, the life consumption for relevant components in the engine must be determined. In order to determine the life consumption of specific components, more detailed knowledge of conditions in separate parts of the engine is required. As it is difficult, or often impossible, to measure for example temperatures, flows, and torques at relevant positions in the engine, such parameters must be calculated based on measurements of other parameters.

A drawback of such an approach is that calculations of such parameters for different positions in the engine are both complex and time consuming, thereby reducing the usability of a more accurate method for determining life consumption of an engine.

SUMMARY

The present disclosure relates to a method for determining a machine condition based on a received set of load data of a machine, including determining machine condition parameters based on measured performance parameters of a machine.

According to a first aspect of the present disclosure, a method is provided for determining a machine condition indicative of life consumption of a machine component subjected to loads during machine operation, comprising the steps of: receiving a set of load data, for a selected point in time, resulting from the machine operation; from a first database comprising predefined machine conditions associated to different sets of load data for the machine, selecting one of the predefined machine conditions, which is most representative of the received set of load data.

Load data should in the present context be understood as data received from sensors in or relating to the active machine.

A machine condition represents a set of parameters influencing the life consumption of a machine component during machine operation.

It should be noted that the database may refer to any data structure suitable for storing data in an organized manner, such as a file, a registry or the like.

The present disclosure is based on the realization that in order to more efficiently determine machine condition parameters which have to be calculated based on measured parameters, a database comprising pre-calculated solutions for a large number of sets of load data can be used. Thereby, instead of performing calculations for each set of load data in an active session of the machine, the resulting machine conditions may be found by matching measured load data with corresponding predefined sets of load data in the database, where each predefined set of load data correspond to a machine condition. Such a matching procedure is generally more time efficient than performing calculations for each individual set of received load data. An additional advantage is that calculations for load data resulting in non-converging solutions can be avoided.

According to one embodiment, the set of load data may comprise values of a plurality of time dependent performance parameters measured at a selected point in time during machine operation.

In one embodiment, each machine condition in the first database may comprise a unique identifier, and the method may further comprise the step of providing an output comprising an identifier for the machine condition most representative of the set of load data and information identifying a machine session.

Furthermore, said first database may further comprise a steady state condition corresponding to each machine condition, each steady state condition being represented by a set of load data performance parameter values. Within the context of the descriptiondisclosure, a steady state condition is here referred to as a predetermined machine state, defined as a state of a machine, at a specific point in time as defined by the specific values of the load data.

According to one embodiment, the method may further comprise the step of: from a second database comprising a set of pre-calculated machine condition values for each of the predefined machine conditions in the first database, retrieve a set of machine condition parameter values corresponding to said machine condition identifier in said output.

In some environments where measured performance parameters need to be classified, it may be desirable to de-classify machine operation load data so that machine conditions can be used for further calculations without disclosing the measured performance parameters. For example, when the machine is an aircraft engine and the machine session is a flight mission, it may be desirable to allow a third party to work with machine condition information for calculating life consumption without revealing mission specific parameters such as aircraft velocity and altitude.

This de-classification, or anonymization, of session data may be achieved by using two separate databases where the first database contains predetermined sets of measured values, steady state conditions, corresponding to predetermined machine conditions, and identifiers for the machine conditions, while the second database contains the actual calculated parameter values of the machine conditions identified by a steady state condition identifier. Thereby, the first database can be classified and the second database can be non-classified and thereby released for use by external parties.

However, in applications where it is not required to isolate performance parameters from resulting determined machine conditions, the contents of the abovementioned first and second databases may be provided in only one database.

According to one embodiment, selecting one of the predefined machine conditions which is most representative of said received set of load data may comprise: selecting a machine condition from the first database by matching a subset of the load data with corresponding steady state condition performance parameter values; defining a subset of steady state conditions comprising the selected steady state condition and a plurality of surrounding steady state conditions based on a tolerance range of at least one parameter value of said subset of load data; calculating the relative differences between each parameter value of the subset of load data and corresponding parameter values for each of said subset of steady state conditions; adding the relative differences together for each steady state condition; and selecting the steady state condition having the smallest total difference.

As it is desirable to match each machine state to the steady state condition most resembling the received set of load data, the abovementioned procedure may advantageously be used to reach the nearest steady state condition. However, alternative selection procedures are also possible to use for reaching the steady state condition closest to a specific set of load data.

In one embodiment, the selected point in time may be selected based on a predetermined selection criterion, which may advantageously be a selection frequency for selecting a plurality of sets of load data at a regular time-interval. As continuously measured parameters may be acquired with a relatively high frequency, using a selection frequency for filtering the measured data may be desirable to avoid having an excessive amount of data. The selection frequency may for example be determined by the speed of transient changes in the measured data. However, the selection may also be performed based on the transient behavior of the measured parameters such that more points are selected in periods where fast transient behavior is observed compared to the parameters are relatively constant over time. Alternatively, points may be selected at predetermined arbitrarily defined instances or intervals where it is desirable to determine a life consumption of a component in a machine.

According to one embodiment, the pre-calculated machine condition values may comprise machine condition values based on previously measured load data and machine condition values based on interpolated load data. The second database preferably comprises machine condition parameters which are calculated from previously measured or simulated load data. However, already for a relatively modest number of measured parameters, the amount of possible load data combinations quickly grows large. Therefore, it may not always be possible to pre-calculate corresponding steady states and resulting machine condition parameter values for all possible sets of load data, as such measured data is not available. Instead, the database may advantageously be padded with interpolated steady states with resulting calculated machine condition values. Thereby, a database having the desired resolution of steady state conditions may be formed.

In one embodiment, if two or more steady state conditions have the same relative difference, a steady state condition corresponding to measured load data is selected over a steady state condition corresponding to interpolated load data. As outlined above, machine condition parameter values may result from calculations or from interpolation. In the event that two steady states are identified which have the same difference compared to a given machine state, within a predetermined range, a steady state condition corresponding to calculated machine condition values may advantageously be selected as that may be seen as more accurate.

According to one embodiment, the step of receiving a set of load data may advantageously comprise verifying that the load data is within a predetermined range. Measured data may be outside of a tolerance range for reasons such as faulty sensors or due to other errors. In such events, it may be desirable to abort the procedure of determining a machine condition at an early stage which may be achieved by comparing measured load data to predefined tolerance ranges.

In one embodiment, load data may comprise measured values of performance parameters influencing a mechanical life length of components in said machine. By measuring performance parameters of the machine influencing the mechanical wear and tear of components in the machine, the resulting determined machine condition may be used to determine the life consumption of specific components in the machine.

Furthermore, the performance parameters may comprise vibrations, stresses and/or strains measured at different locations in the machine. Measurements of vibrations and stress/strain are readily obtainable from conventional sensors such as accelerometers and strain gauges. Moreover, measurements of vibration and stress/strain may be made both on static structural elements as well as on active elements such as components in an engine.

Additionally, the performance parameters may comprise engine rpm (revolutions per minute) and/or ambient temperature. Parameters such as engine rpm and ambient temperature, or temperatures at selected positions in an engine, are readily obtainable through conventional measurement methods.

In one embodiment, the machine condition values may advantageously comprise engine pressure, temperature, mass flow and/or torque. In contrast to the abovementioned measured performance parameters, machine condition parameters such as engine pressures at specific positions in an engine or mass flows are often not possible to measure. Therefore, it is desirable to be able to determine such parameters based on measurable parameters.

According to one embodiment, the machine may be an aircraft engine and the load data may comprise aircraft altitude and aircraft velocity.

In a further embodiment, the load data may comprise recorded loads from a flight mission of an aircraft.

According to a second aspect, it is provided a method for predicting life consumption of a component in a machine, comprising determining a machine condition according to any one of the above-mentioned embodiments and predicting the life consumption for the machine component based on the determined machine condition. Predicting life consumption of a component may further comprise calculating at least one of stresses, strains and temperature for a critical area of the component based on the determined machine condition; and predicting life consumption of the component for the load data based on at least one of the calculated stresses, strains and temperatures.

According to a third aspect, it is provided a system for determining a machine condition indicative of life consumption of a machine component subjected to loads during machine operation, the system comprising: a first database comprising predefined machine conditions associated to different sets of load data for the machine; wherein the system is configured to: receive a set of load data, for a selected point in time, resulting from the machine operation; and selecting one of the predefined machine conditions, which is most representative of the received set of load data.

The system may further comprise a second database comprising a set of pre-calculated machine condition values for each of the predefined machine conditions in the first database, the system being configured to, from the second database, retrieve a set of machine condition values corresponding to a selected machine condition.

Effects and features of the second and third aspects of the present invention are largely analogous to those described above in connection with the first aspect.

According to a fourth aspect, it is provided a computer program product comprising a computer readable medium having stored thereon computer program means for causing a processing unit to determine a machine condition indicative of life consumption of a machine component subjected to loads during machine operation, the computer program comprising: code for receiving a set of load data, for a selected point in time, resulting from the machine operation; code for, from a first database comprising predefined machine conditions associated to different sets of load data for the machine, selecting one of the predefined machine conditions, which is most representative of the received set of load data.

The processing unit may preferably be provided in a server or similarly, and the computer readable medium may be one of a removable nonvolatile random access memory, a hard disk drive, a floppy disk, a CD-ROM, a DVD-ROM, a USB memory, an SD memory card, or a similar computer readable medium known in the art.

The computer program product may further comprise code for, from a second database comprising a set of pre-calculated machine condition values for each of the predefined machine conditions in the first database, retrieving a set of machine condition values corresponding to a selected machine condition.

Further effects and features of this fourth aspect of the present invention are largely analogous to those described above in connection with the first aspect.

Further features of, and advantages with, the present disclosure will become apparent when studying the appended claims and the following description. The skilled person realize that different features of the present disclosure may be combined to create embodiments other than those described in the following, without departing from the scope of the present invention.

BRIEF DESCRIPTION OF THE DRAWINGS

These and other aspects of the presently described subject matter will now be described in more detail with reference to the appended drawings showing an embodiment, wherein.

DETAILED DESCRIPTION

Figure 1:
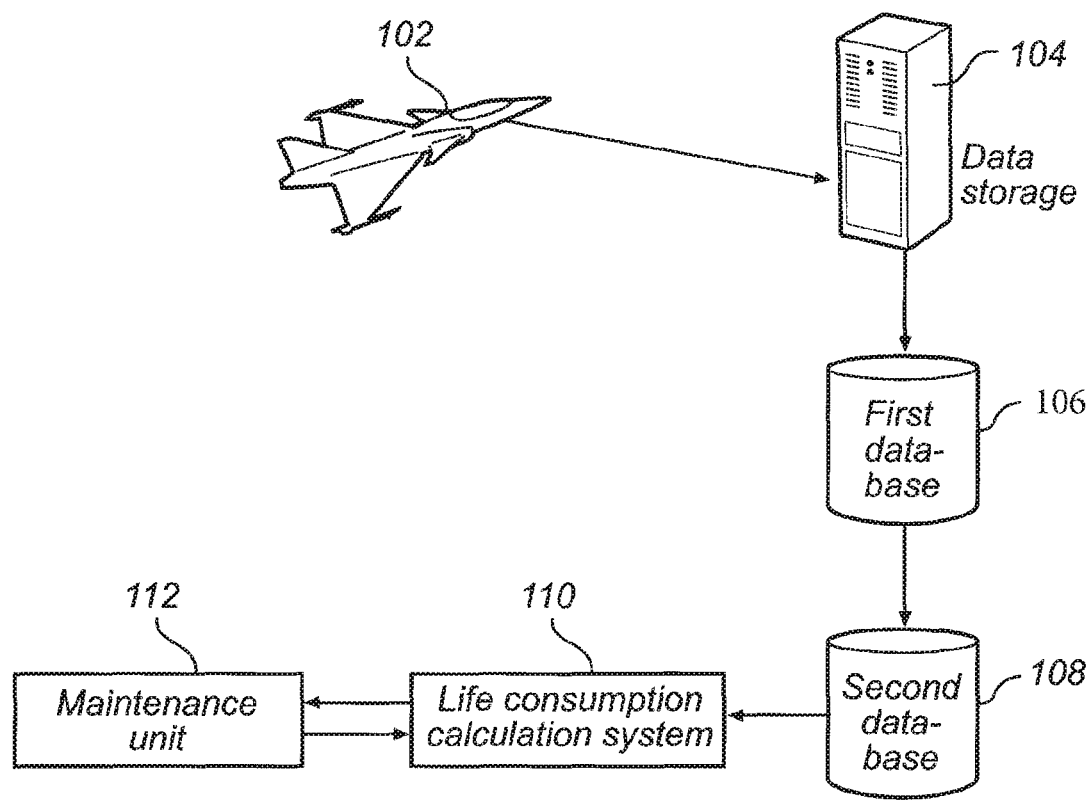
FIG. 1 schematically illustrates an overall maintenance system for an aircraft.

The present subject matter will now be described more fully hereinafter with reference to the accompanying drawings, in which embodiments are shown. The present subject matter may, however, be embodied in many different forms and should not be construed as limited to the embodiments set forth herein; rather, these embodiments are provided for thoroughness and completeness, and fully convey the scope of the disclosed subject matter to the skilled addressee. Like reference characters refer to like elements throughout.

In the present detailed description, various embodiments of a method for determining a machine condition according to the present disclosure are mainly discussed with reference to machine condition parameters in an aircraft engine. It should be noted that this by no means limits the scope of the present disclosure which is also applicable to other types of machines such as engines in land based vehicles, boats and electrical machinery such as for example wind power plants or water turbines.

FIG. 1 schematically illustrates an overall maintenance system 100 for a machine. In FIG. 1 a fighter aircraft 102 is illustrated as an example of the machine, the fighter aircraft 102 comprising a plurality of mechanical parts out of which some are defined as critical life limited.

Figure 2:
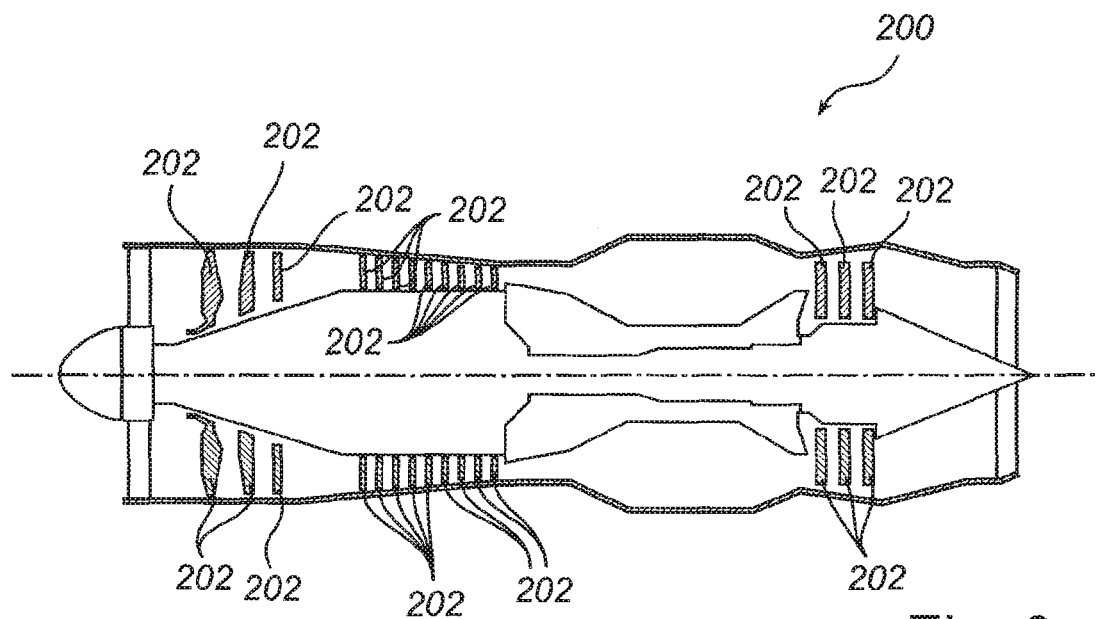
FIG. 2 illustrates a cross-section of a jet engine comprising a number of life limiting components/parts.

In FIG. 2 there is depicted a cross-section of a jet engine 200 comprising of a number of life limiting components 202, a jet engine 200 being specifically exposed to forces that may cause failure to its components/parts. Typically, several of the life limiting components are rotating components and/or components exposed to high temperatures or mechanical loads. A number of parameters are measured in the jet engine during the time when the machine is in operation (defined as an active machine session or a load session), for example time, power level angle, altitude, aircraft speed, ambient temperature, inlet temperature, low pressure rotor speed, high pressure rotor speed, combustor pressure, turbine outlet temperature, turbine outlet pressure, control mode of, e.g., the aircraft 102. For the fighter aircraft 102 from FIG. 1, the plurality of measured parameter values is recorded and stored in a computer storage medium (not shown) available on the fighter aircraft 102.

With further reference to FIG. 1, the machine sessions with recorded parameter values is transferred (e.g., wired or wirelessly) to for example a data storage 104, possibly arranged on the "ground", e.g., separate from the aircraft 102. The data recorded during a flight is referred to as measured performance parameter values from a machine session. The parameter values stored in the data storage 104 are matched against parameter values in a first database 106 in order to identify steady state conditions. Identifiers of the steady state conditions are then used to retrieve corresponding machine condition parameters from a second database 108.

The machine condition parameters are used by a life consumption calculation system 110 to predict the life consumption of a component/part of e.g., the jet engine 200. The accumulated life consumption results may be transferred to a maintenance unit 112. The maintenance unit 112 may, after an indication (e.g., a determination made by the maintenance unit 112) that a component is approaching the end of its useful life, determine a suitable maintenance action. The maintenance action may for example be to service the component or to replace it. When a maintenance action has taken place, information of that (maintenance) event is sent back to the life consumption calculation system 110, for example comprising information as to that the component has been serviced or exchanged for another new component, allowing the life consumption calculation system 110 to adapt its calculations based on the current life time state of the component. A (slightly) used component may also be installed, whereas a predicted life consumption adapted for the used component may be transferred from the maintenance unit 112 to the life consumption system 110 in a similar manner.

Figure 3:
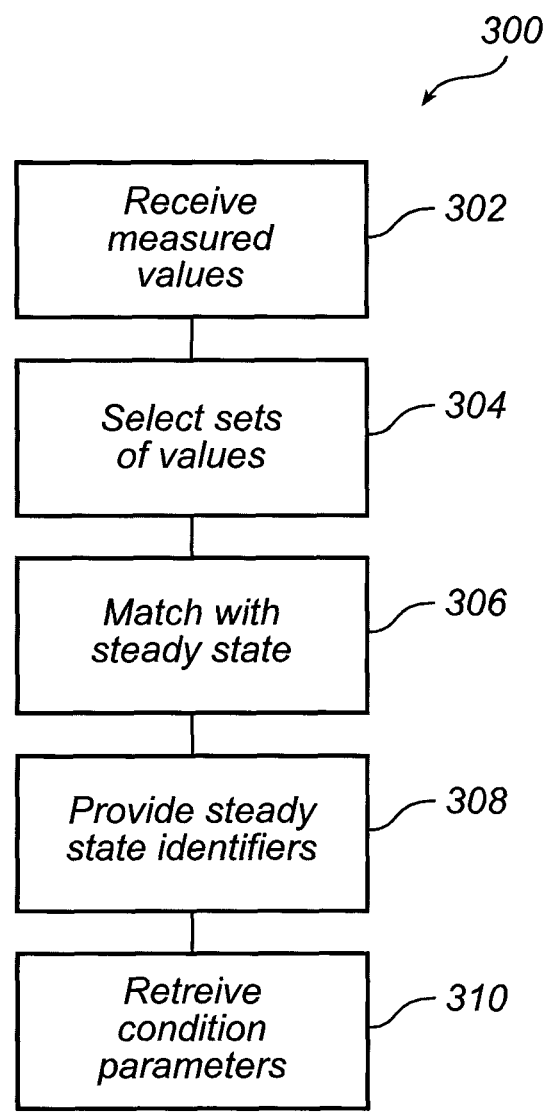
FIG. 3 is a flow-chart outlining the general steps of the method according to an embodiment.

FIG. 3 is a flowchart outlining the general steps of a method according to an embodiment.

In a first step 302, load data in the form of measured performance parameters from a machine session are received. For an aircraft, the session may be a flight mission and the measured parameters may include velocity, altitude, ambient temperature, turbine speed etc. In the present example, performance parameters values are acquired at a frequency of about 10 Hz (ten Hertz). It should however be noted that parameter values may be acquired at any suitable frequency, in practice only limited by the capacity of the data acquisition hardware.

Next, a filtering step 304 is performed where sets of the acquired parameter values, i.e. sets of load data, are selected at a frequency of ⅓ Hz which provides a sufficient time resolution for a flight mission in the present application. Each set of parameter values, i.e., the parameters for each selected point in time here define a machine state.

Additional performance parameters may be calculated based on the measured performance parameters either before or after the filtering step. Furthermore, the measured parameter values may be verified against predetermined tolerance ranges where values falling outside a tolerance range either may trigger an alert or be removed for further manual treatment of the corresponding machine state.

In the next step 306, each of the machine states are matched against steady state conditions stored in a first database. The first database is created from previously measured performance parameters defining steady state conditions in a multi-dimensional grid, where each parameter represents a dimension in the grid. If certain points in the database grid are missing, i.e., if the measured performance parameters from which the database is formed does not cover all points in the grid, such points in the grid may be formed by interpolating between existing points. Furthermore, if it is desirable to have a denser grid, for example, in regions where it is known that parts of the machine is exposed to high stress, a denser grid may be formed by interpolating between existing points.

Typically, a subset of the measured parameter values for a given machine state are used for matching to the grid in order to improve the speed of the matching step. Furthermore, sufficient accuracy may be achieved even if all measured parameters are not matched. In the present example approximately ten parameters out of thirty measured parameters are used for matching to the grid. Accordingly, the dimensionality of the grid is equal to the number of parameters to be matched.

Figure 4:
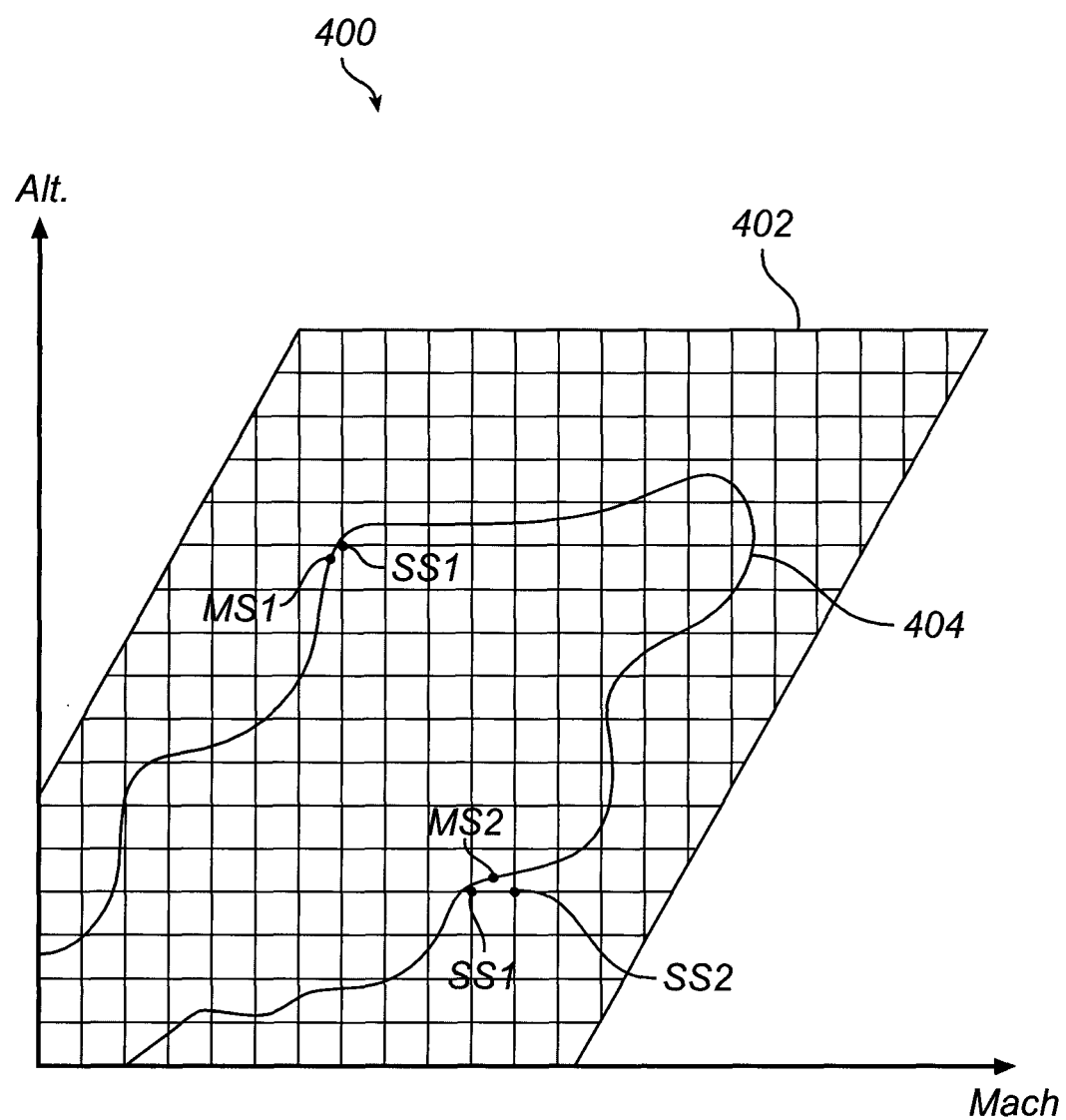
FIG. 4 is a diagram schematically illustrating parts of the method according to an embodiment.

For simplicity, the matching procedure will be described and illustrated with reference to two measured performance parameters, aircraft velocity (Mach number) and aircraft altitude. As illustrated in FIG. 4, possible velocity and altitude combinations may be drawn as a two-dimensional grid in a diagram 400 defining the flight envelope 402 of the aircraft. In practice, the matching is performed against a multi-dimensional grid comprising around 10 measured parameter values which may include, but are not limited to, time, power level angle, altitude, aircraft speed, ambient temperature, inlet temperature, low pressure rotor speed, high pressure rotor speed, combustor pressure, turbine outlet temperature, turbine outlet pressure and control mode.

The path 404 in the diagram corresponds to a mission and each point on the path represents a machine state. Each intersection of the grid corresponds to parameter values in the first database for given a steady state condition.

First, an approximate matching is performed identifying a number of steady state conditions near a machine state. Next, the relative distance (difference) between the machine state (MS) and the steady state (SS) points is determined for each of the parameters (P) in the grid as distance=abs($P_{MS}$−$P_{SS}$)/$P_{MAX}$ where $P_{MAX}$ is the maximum allowed value of the parameter P. The relative differences for all parameters matched to the grid are then added together for each machine state, and the steady state condition having the smallest total difference is selected.

An example illustrated in FIG. 4 shows $MS_1$ having the nearest steady state condition $SS_1$. It may be so that two steady state conditions are located at the same relative distance from a machine state as illustrated by $MS_2$, $SS_2$ and $SS_3$. In such an event, a calculated steady state condition resulting from measured parameters are selected before an interpolated steady state condition.

Furthermore, if two steady state conditions located at the same relative distance are both based on either measured or interpolated values, the steady state condition may be selected based on a proximity to the most recently matched machine state, or based on possible steady state condition parameters for the most recently matched machine state. Alternatively, the measured parameters may be ranked with different priority so that the point having the smallest difference to a highly prioritized parameter is selected. However, with increasing dimensionality of the grid, the likelihood of two points having the same relative difference is rapidly decreasing.

After all machine states have been matched with their nearest steady state conditions, an output is provided in step 308 which comprises identifiers of the steady state conditions. The output may typically be comprised in a file comprising steady state condition identifiers vs. time. The output may also comprise metadata which identifies the mission and/or the engine and engine components.

In the final step 310, machine condition parameters are retrieved from a second database for each of the steady state condition identifiers. The use of two databases enables the anonymizing of measured parameters in environments such as for a military aircraft where measured parameters such as Mach number and altitude must be kept secret. However, for applications where confidentiality is not an issue, one single database which comprises both steady state conditions and the corresponding machine condition values may be used. Machine condition parameters comprise calculated pressures, mass flows, temperatures, torques, etc. for different positions in the engine and relating to various components of the engine. Thousands of parameters may be required for accurately calculating a life consumption of individual components in the engine. Based on the provided machine condition parameters, thermal and mechanical loads in the form of stresses strains and temperatures can be calculated as a step in determining the life consumption of components resulting from a flight mission.

Even though the presently disclosed subject matter has been described with reference to specific exemplifying embodiments thereof, many different alterations, modifications and the like will become apparent for those skilled in the art. Variations to the disclosed embodiments can be understood and effected by the skilled addressee, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method, comprising:
 receiving a set of load data, for a selected point in time, the load data including data from operation of a machine;
 from a first database comprising predefined machine conditions associated to different sets of load data for said machine, selecting a predefined machine condition that is most representative of said received set of load data; and
 retrieving, from a set of pre-calculated machine condition values for each of said predefined machine conditions in said first database, a set of machine condition parameter values corresponding to the selected machine condition;
 wherein said pre-calculated machine condition values comprise machine condition values based on previously measured load data and machine condition values based on interpolated load data.

2. The method of claim 1, wherein said set of load data comprises values of a plurality of time dependent performance parameters measured at a selected point in time during machine operation.

3. The method of claim 1, wherein each machine condition in said first database comprise a unique identifier, the method further comprising:
 providing an output comprising an identifier for the machine condition most representative of said set of load data and information identifying a machine session.

4. The method of claim 1, wherein said first database further comprises a steady state condition corresponding to each machine condition, each steady state condition being represented by a set of load data performance parameter values.

5. The method of claim 1, wherein:
 a second database comprises the set of pre-calculated machine condition values for each of said predefined machine conditions in said first database.

6. The method of claim 1, wherein selecting the predefined machine conditions that is most representative of said received set of load data comprises:
 selecting a machine condition from said first database by matching a subset of said load data with corresponding steady state condition values;
 defining a subset of steady state conditions comprising said selected steady state condition and a plurality of surrounding steady state conditions based on a tolerance range of at least one parameter value of said subset of load data;
 calculating the relative differences between each parameter value of said subset of load data and corresponding parameter values for each of said subset of steady state conditions;
 adding said relative differences together for each steady state condition; and
 selecting the steady state condition having the smallest total difference.

7. The method of claim 6, wherein, if two or more steady state conditions have a same relative difference, a steady state condition corresponding to measured load data is selected over a steady state condition corresponding to interpolated load data.

8. The method of claim 1, wherein said selected point in time is selected based on a predetermined selection criterion.

9. The method of claim 8, wherein said predetermined selection criterion is a selection frequency for selecting a plurality of sets of load data at a regular time-interval.

10. The method of claim 1, wherein the step of receiving a set of load data comprises verifying that said load data are within a predetermined range.

11. The method of claim 1, wherein said load data comprises measured values of performance parameters influencing a mechanical life length of components in said machine.

12. The method of claim 11, wherein said performance parameters comprises at least one of vibration, stress, strain, engine revolutions per minute, and ambient temperature.

13. The method of claim 1, wherein said machine condition comprises at least one of engine pressure, temperature, mass flow, and torque.

14. The method of claim 1, wherein said machine is an aircraft engine, and said load data comprises aircraft altitude and aircraft velocity.

15. The method of claim 1, further comprising predicting the life consumption for said machine component based on the selected determined machine condition.

16. The method of claim 15, wherein predicting life consumption of a component further comprises:
 calculating at least one of stresses, strains and temperature for a critical area of said component based on said determined machine condition; and
 predicting life consumption of said component for said load data based on said at least one of the calculated stresses, strains and temperatures.

17. A system, comprising:
a first database comprising predefined machine conditions associated to different sets of load data for a machine;
wherein said system includes a computer that is programmed to:
receive a set of load data, for a selected point in time, resulting from said machine operation; and
selecting a predefined machine condition that is most representative of said received set of load data; and
retrieving, from a set of pre-calculated machine condition values for each of said predefined machine conditions in said first database, a set of machine condition parameter values corresponding to said selected machine condition;
wherein said pre-calculated machine condition values comprise machine condition values based on previously measured load data and machine condition values based on interpolated load data.

18. The system of claim 17, further comprising a second database comprising the set of pre-calculated machine condition values for each of said predefined machine conditions in said first database.

19. A method, comprising:
receiving a set of load data, for a selected point in time, the load data including data from operation of a machine;
from a first database comprising predefined machine conditions that each are associated to different sets of load data for said machine and that further comprises a steady state condition corresponding to each machine condition, each steady state condition being represented by a set of load data performance parameter values, selecting a predefined machine condition that is most representative of said received set of load data;
selecting a machine condition most representative of said set of load data and information identifying a machine session; and
from a set of pre-calculated machine condition values for each of said predefined machine conditions in said first database, retrieving a set of machine condition parameter values corresponding to said selected machine condition;
wherein selecting the predefined machine conditions that is most representative of said received set of load data includes:
selecting a machine condition from said first database by matching a subset of said load data with corresponding steady state condition values;
defining a subset of steady state conditions comprising said selected steady state condition and a plurality of surrounding steady state conditions based on a tolerance range of at least one parameter value of said subset of load data;
calculating the relative differences between each parameter value of said subset of load data and corresponding parameter values for each of said subset of steady state conditions;
adding said relative differences together for each steady state condition; and
selecting the steady state condition having the smallest total difference.

\* \* \* \* \*